US008887450B2

(12) United States Patent
Blackwelder

(10) Patent No.: US 8,887,450 B2
(45) Date of Patent: Nov. 18, 2014

(54) SUPPORT BEARING ASSEMBLY

(75) Inventor: Paul Bradford Blackwelder, Wadsworth, OH (US)

(73) Assignee: The Will-Burt Company, Orville, OH (US)

( * ) Notice: Subject to any disclaimer, the term of this patent is extended or adjusted under 35 U.S.C. 154(b) by 1082 days.

(21) Appl. No.: 11/253,457

(22) Filed: Oct. 19, 2005

(65) Prior Publication Data

US 2006/0201076 A1    Sep. 14, 2006

Related U.S. Application Data

(60) Provisional application No. 60/660,805, filed on Mar. 11, 2005.

(51) Int. Cl.
*E04H 12/34* (2006.01)
*E04H 12/18* (2006.01)
*F16C 19/54* (2006.01)

(52) U.S. Cl.
CPC .............. *F16C 19/54* (2013.01); *E04H 12/182* (2013.01); *F16C 2300/34* (2013.01)
USPC ............................................ 52/118; 52/121

(58) Field of Classification Search
USPC ............. 52/40, 110, 111, 114, 117, 118, 121; 52/632; 248/405; 343/711, 874; 362/384; 74/89, 89.35; 384/461; 464/160, 171, 464/182
See application file for complete search history.

(56) References Cited

U.S. PATENT DOCUMENTS

| | | | | |
|---|---|---|---|---|
| 561,861 A * | 6/1896 | Briscoe | ......................... | 384/461 |
| 1,366,966 A * | 2/1921 | Spear | ......................... | 193/35 R |
| 1,494,695 A * | 5/1924 | McCluskey | .................. | 384/461 |
| 1,539,702 A * | 5/1925 | Szuba | ......................... | 384/461 |
| 2,488,929 A | 10/1949 | Palumbo | | |
| 2,488,825 A * | 11/1949 | Palumbo | ....................... | 384/453 |
| 2,822,225 A * | 2/1958 | Teufel | ........................ | 384/461 |
| 3,011,364 A * | 12/1961 | Mims | ............................ | 475/196 |
| 3,597,029 A * | 8/1971 | Marcum | ....................... | 384/461 |
| 3,737,202 A * | 6/1973 | Rosales | ........................ | 384/461 |
| 3,762,227 A * | 10/1973 | Bohnhoff | ..................... | 74/89.37 |
| 4,045,100 A * | 8/1977 | Beauchet | ..................... | 384/461 |
| 4,062,156 A | 12/1977 | Roth | | |
| 4,420,917 A | 12/1983 | Parlanti | | |

(Continued)

FOREIGN PATENT DOCUMENTS

| | | | | |
|---|---|---|---|---|
| DE | 3611810 A1 * | 8/1986 | .............. | E04H 12/18 |
| GB | 110400 | 10/1917 | | |
| GB | 970879 | 9/1964 | | |
| JP | 07330292 A * | 12/1995 | ................ | B66F 3/10 |

OTHER PUBLICATIONS

International Search Report for International Application No. PCT/US05/38251.
Supplementary European Search Report of Jan. 24, 2011, 7 pages.

*Primary Examiner* — Elizabeth A Plummer
(74) *Attorney, Agent, or Firm* — Fay Sharpe LLP

(57) ABSTRACT

A rigid support bearing for a rotating shaft has bearings arranged concentrically around the shaft instead of spaced axially and is used in a screw drive telescoping mast assembly. An axial drive screw is centrally located in the mast assembly for extending and retracting the tubular sections. A lower bearing assembly supports the drive screw and uses the concentric bearing arrangement to reduce the nested height of the mast.

12 Claims, 6 Drawing Sheets

(56) References Cited

U.S. PATENT DOCUMENTS

| | | | | |
|---|---|---|---|---|
| 4,590,816 A | * | 5/1986 | Weyer | 74/89.35 |
| 4,614,128 A | * | 9/1986 | Fickler | 74/89.31 |
| 4,793,197 A | * | 12/1988 | Petrovsky | 74/89.35 |
| 4,843,402 A | | 6/1989 | Clement | |
| 4,871,138 A | | 10/1989 | Sauter | |
| 5,035,094 A | * | 7/1991 | Legare | 52/118 |
| 5,102,375 A | | 4/1992 | Featherstone | |
| 5,107,672 A | | 4/1992 | Featherstone | |
| 5,139,464 A | | 8/1992 | Lehnert | |
| 5,163,650 A | | 11/1992 | Adams et al. | |
| 5,168,679 A | | 12/1992 | Featherstone | |
| 5,203,746 A | | 4/1993 | Lehnert | |
| 5,572,837 A | | 11/1996 | Featherstone et al. | |
| 5,593,129 A | | 1/1997 | Adams et al. | |
| 5,615,855 A | | 4/1997 | Marue et al. | |
| 5,718,087 A | | 2/1998 | Featherstone et al. | |
| 5,743,635 A | | 4/1998 | Hulse et al. | |
| 5,789,719 A | | 8/1998 | Pary et al. | |
| 5,820,272 A | * | 10/1998 | Nashiki et al. | 384/461 |
| 5,943,910 A | * | 8/1999 | Babinski | 74/89.35 |
| 5,980,070 A | | 11/1999 | Hulse et al. | |
| 6,067,868 A | * | 5/2000 | Nakamura et al. | 74/89.35 |
| 6,290,377 B1 | | 9/2001 | Hulse | |
| 6,299,336 B1 | | 10/2001 | Hulse | |
| RE37,559 E | | 2/2002 | Marue et al. | |
| 6,546,677 B1 | | 4/2003 | Featherstone | |
| 6,582,105 B1 | | 6/2003 | Christensen | |
| 6,731,470 B1 | * | 5/2004 | Oveyssi | 360/265.6 |
| 6,761,080 B2 | * | 7/2004 | Lange et al. | 74/89.37 |
| 6,767,115 B2 | | 7/2004 | Blackwelder | |
| 7,775,722 B2 | * | 8/2010 | Friedl et al. | 384/512 |
| 2003/0122438 A1 | * | 7/2003 | Winkel et al. | 310/112 |
| 2004/0081379 A1 | * | 4/2004 | Shirasawa | 384/461 |

* cited by examiner

SUPPORT BEARING ASSEMBLY

CLAIM OF PRIORITY

This application claims priority to provisional Application No. 60/660,805, filed on Mar. 11, 2005, which is incorporated by reference herein.

BACKGROUND OF THE INVENTION

The present invention relates to rigid supports for rotating shafts. More particularly, it relates to the application of a rigid support to one end of an axial drive screw in a screw drive telescoping mast.

The present invention is applicable to a screw-driven telescoping mast and will be described with particular reference thereto; however, the invention has much broader applications and may be used in various other applications where a rigid bearing assembly for a rotating shaft is required.

Two important criteria for a telescoping mast are the "nested" or fully retracted height and the "extended" or fully extended height. The nested height is the height of the mast when fully retracted. For a given extended height many factors can affect the nested height. These may include the number of tubes in the mast, the amount of overlap between tubes when extended and the details of the end features (such as collars and bottom structures) on each tube. For screw driven masts an additional factor affecting the mast nested height is the amount of height required for a support for supporting the axial drive screw. It is preferable to minimize the nested height. A smaller nested height helps facilitate integrating the mast in shelters and vehicles where clearance is a concern. Thus, it is preferable to provide a drive screw support which minimizes the nested height of the mast.

Existing rigid supports for rotating shafts use two bearings which are axially spaced along the length of the shaft. This spacing results in a height of the support typically three (3) times the diameter of the shaft or more. Thus, in screw drive mast applications where the screw is has a one (1) inch diameter, the spacing of the axial support would be about three (3) inches. When the thickness of the bearings and the necessary support structures are included, an overall height for the rigid bearing assembly of five (5) or more inches can result. This height proves excessive for many screw drive telescoping mast applications. Thus, this excessive height is a deficiency that the present invention addresses and overcomes.

Some existing screw driven telescoping masts attempt to minimize the vertical space required of the axial screw support bearings by using a single bearing instead of the preferred rigid bearing assembly. This arrangement provides inadequate support to the screw, allowing the screw to wobble during operation, potentially causing damage to the mast. This single bearing scheme is also only workable at all at a slow speed, which is inconvenient for any user and potentially critical for the emergency or military user. Thus, there is a need for a mast telescopic system which overcomes the above-mentioned defects and others while providing more advantageous overall results.

SUMMARY OF THE INVENTION

The present invention relates to a rigid bearing support for a rotating shaft. In a particular application, the invention relates to a rigid support for a centrally located, axial drive screw for a telescoping mast assembly. The invention can further be used in any situation requiring a rigid bearing support for a rotating shaft.

The primary aspect of the present invention is to provide a rigid bearing support for a rotating shaft via a pair of bearings that are arranged concentric to one another.

In accordance with another aspect of the invention, a rigid bearing support has a bearing assembly base; a first bearing assembly positioned on the base; and, a second bearing assembly positioned radially outwardly of the first bearing assembly on the bearing assembly base wherein the first and second bearing assemblies are concentric to each other.

In accordance with another aspect of the invention, a telescoping mast assembly has at least two elongate tubular sections, wherein a second elongate tubular section is telescopically received by a first elongate tubular section. An axial drive screw is centrally located in the mast assembly for extending and retracting the second elongate tubular section. A lower support assembly supports a lower portion of the drive screw. The lower support assembly has two bearing assemblies arranged concentrically about the axial drive screw.

In accordance with yet another aspect of the invention, a method of supporting a drive screw for a mast assembly includes: providing a first bearing assembly which receives a lower end of a drive screw through a central portion thereof; providing a hug nut adjacent the first bearing assembly and surrounding the lower portion of the drive screw; and providing a second bearing assembly positioned radially outward of the first bearing assembly and concentric with the first bearing assembly.

The screw drive mast of the present invention can be used for communications and surveillance applications that require rapid, automatic development and maximum reliability with high antenna pointing accuracy. The mast has self-locking sections and positive mechanical drive for extension and retraction.

A primary aspect of the present invention is to provide a rigid bearing support for a telescoping assembly shaft that reduces the overall height of the support.

A still further aspect of the invention is to provide a rigid bearing support which reduces the axial space required for the rigid support bearing assembly for the axial drive screw in a screw drive mast.

A still further aspect of the invention is to provide a rigid bearing support which results in a significant reduction in the nested height of the mast.

Another aspect of the present invention is to provide a support for the drive screw of the mast to minimize wobble of the screw.

Yet another aspect of the present invention is provide a telescoping mast assembly which obviates the problems and limitations of the prior art devices.

Yet another aspect of the present invention is to provide low height rigid bearing support for a drive screw used in any application, not necessarily limited to an axial location or to a telescoping mast assembly.

A final aspect of the present invention is to provide a lower height rigid bearing support for a rotating shaft used in any application, in particular where there are axial space constraints.

These and other aspects and advantages will become apparent from the following description taken together with the accompanying drawings.

BRIEF DESCRIPTION OF THE DRAWINGS

The invention may take form in certain components, structures, and steps, the preferred embodiments of which will be illustrated in the accompanying drawings.

DETAILED DESCRIPTION OF THE PREFERRED EMBODIMENT

Figure 1:
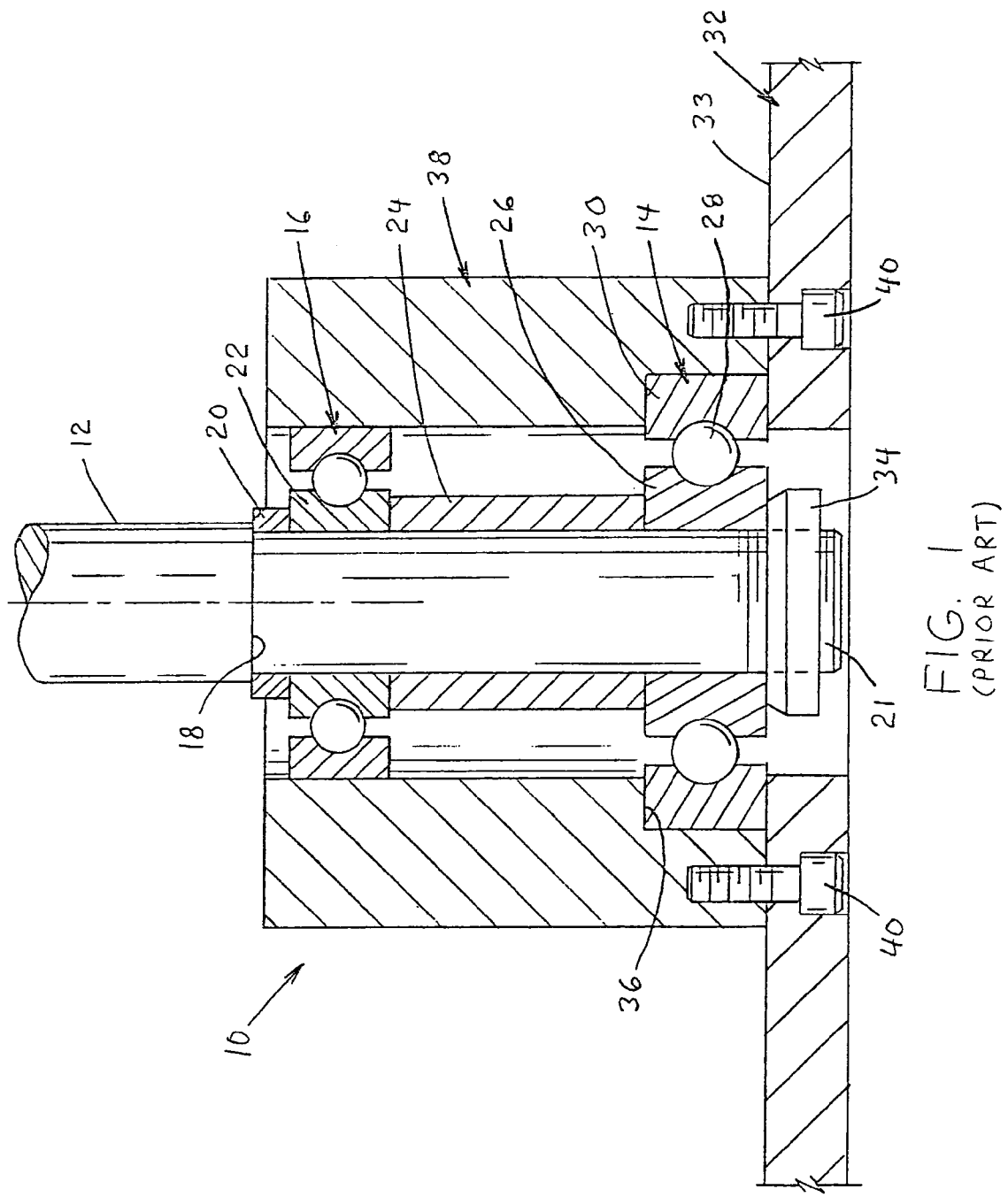
FIG. 1 is a side sectional view illustrating an existing rigid bearing support with bearings axially separated from each other.

Referring to FIG. 1, an existing rigid bearing assembly 10 surrounding a rotating shaft 12 is illustrated. The rotating shaft is shown to be the axial drive screw of a screw drive telescoping mast assembly, but is not limited to same. The bearing assembly allows the shaft to freely rotate. Bearings 14 and 16 are positioned axially along the length of the shaft to provide lateral support to the rotating shaft. The axial spacing of the bearings provides a resistant moment to prevent the shaft from tipping. Vertical support in a downward direction is provided by a lower shoulder 18 of the shaft transmitting force through a washer 20, an inner race 22 of upper bearing 16, a spacer 24, an inner race 26 of the lower bearing 14, ball bearings 28 of the lower bearing, and an outer race 30 of lower bearing 14 onto the upper surface 33 of base 32. Vertical support in an upward direction is provided by the shaft lifting up on a locking nut or "hug nut" 34 threaded onto the bottom of the shaft. Force is transmitted through the hug nut to the inner race of the lower bearing, the ball bearing of the lower bearing, the outer race of the lower bearing onto a shoulder 36 of a bearing assembly housing 38. The bearing assembly housing is attached to base 32 via retaining screws 40.

A rigid bearing support should adequately perform the following functions: allow the shaft to rotate, provide lateral support for the shaft, provide resistant moment to shaft tipping, and provide axial support in upward and downward directions. Most existing rigid bearing support assemblies perform these functions, but a deficiency of these supports is that they extend along the axis of the rotating shaft which is a disadvantage in some applications such as a screw drive telescoping mast. The present invention performs all of the necessary functions of a rigid bearing support while overcoming the above-mentioned deficiency.

Figure 5:
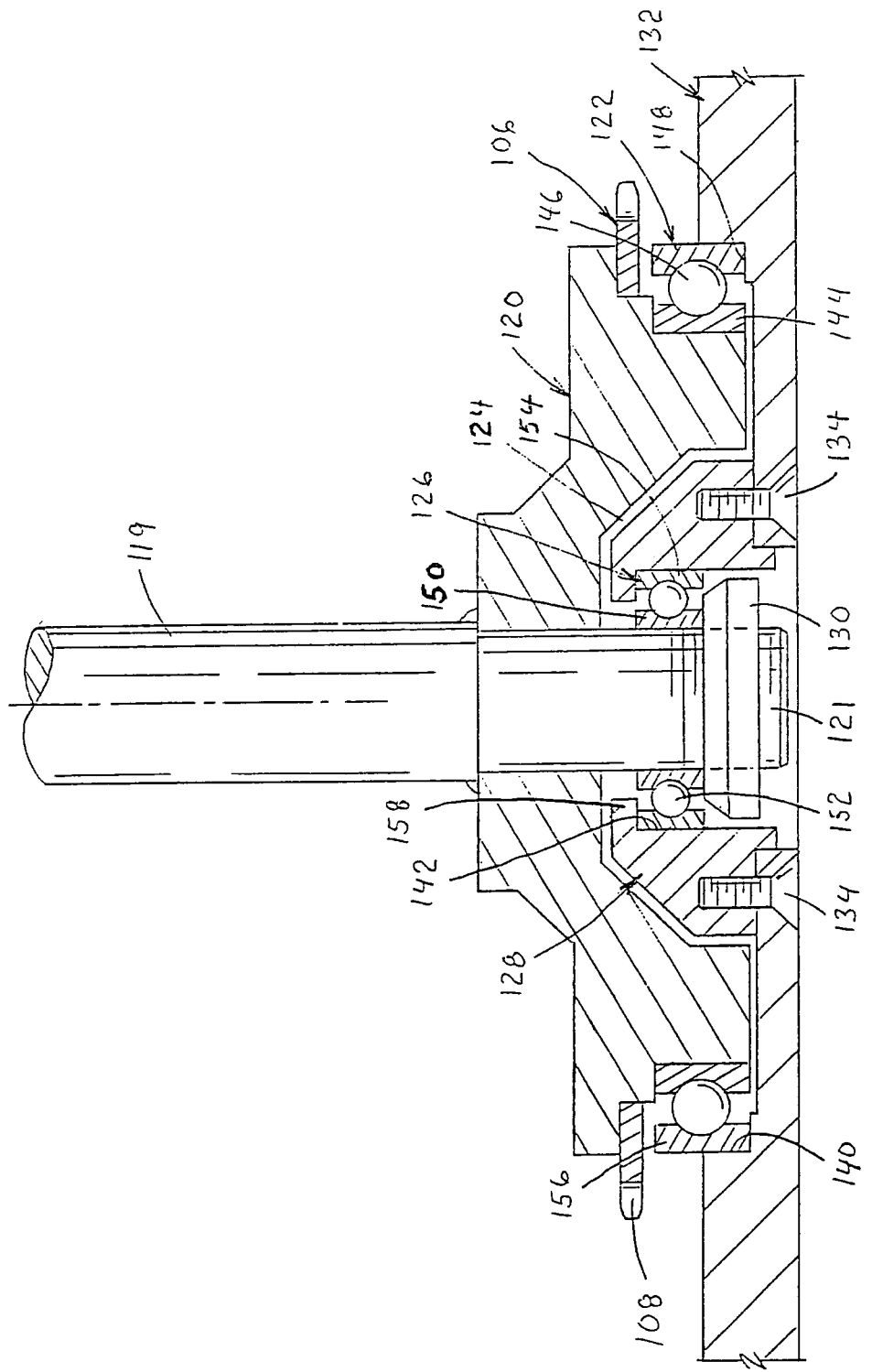
FIG. 5 is a further enlarged sectional view illustrating a rigid bearing support in accordance with the present invention; and, FIG. 6 is a top plan sectional view taken along line 6-6 of FIG. 3.

Referring now to the drawings wherein the showings are for the purpose of illustrating preferred embodiments of the invention only, and not for the purpose of limiting same, referring to FIG. 5, in accordance with the preferred embodiment of the present invention, a drive shaft portion 119 with a threaded end 121 is rigidly and permanently attached to a screw base 120. The screw base extends from the shaft to an outer bearing 122. The inside diameter of the outer bearing is significantly larger than the shaft diameter, in contradistinction to existing bearing assemblies. The screw base has a concave void 124 which allows space for an inner bearing 126 and a middle bearing ring 128. The inner bearing slides freely onto the end of the shaft 119 and is retained at the lower end by a prevailing torque locking nut or "hug" nut 130 threaded onto the end of the shaft and at the upper end and sides by the middle bearing ring 128. The middle bearing ring is attached to a bearing assembly base 132 by retaining screws 134 or any suitable fasteners. The shaft is able to rotate since it is connected to the base 132 by retaining screws 134 or any suitable fasteners. The shaft is able to rotate since it is connected to the base 132 exclusively through the ball bearings 122, 126. The shaft is supported laterally via the bearings 122, 126. The shaft is supported laterally via the bearings 122, 126 pushing against shoulders 140, 142 on the base 132 and the middle bearing ring 128, respectively.

The bearing assembly provides a resistant moment to shaft tipping as follows. When the shaft attempts to tip, it pushes down via the screw base 120 onto one side of outer bearing 122. This force is transmitted via an inner race 144 to ball bearings 146 and finally onto a floor 148 of the bearing assembly base 132. Simultaneously the shaft lifts up at its center portion via the hug nut 130 threaded on the end of the shaft 119 pressing on the inner ring 150 of the inner bearing 126 then through ball bearings 152, outer ring 154 to middle ring 128 and finally the bearing assembly base with attachment screws 134. The combination of pressing down on one side of a large outer bearing with the lifting up at the center of the shaft that generates the resistant moment to shaft tilting.

The bearing assembly also provides axial support in opposite upward and downward directions. In the downward direction, force is transmitted through the screw base 120 to the outer race 156 of the outer bearing 122 through the ball bearings 146 through the inner race 144 and onto the floor 148 of the bearing assembly base 132. In the upward direction, force is transmitted through the hug nut 130 threaded onto the end of the shaft to the inner race 150 of the inner bearing 126 through the ball bearings 152 through the outer race 154 and onto the roof 158 of the middle ring 128. The middle ring is attached to the bearing assembly base 132 with attachment screws 134.

Thus, the invention fulfills all functions of a rigid bearing assembly, but since its bearings are concentric rather than axially separated a noticeable height savings is achieved. In some embodiments such as a screw drive telescoping mast, this height savings is a distinct advantage.

Figure 2:
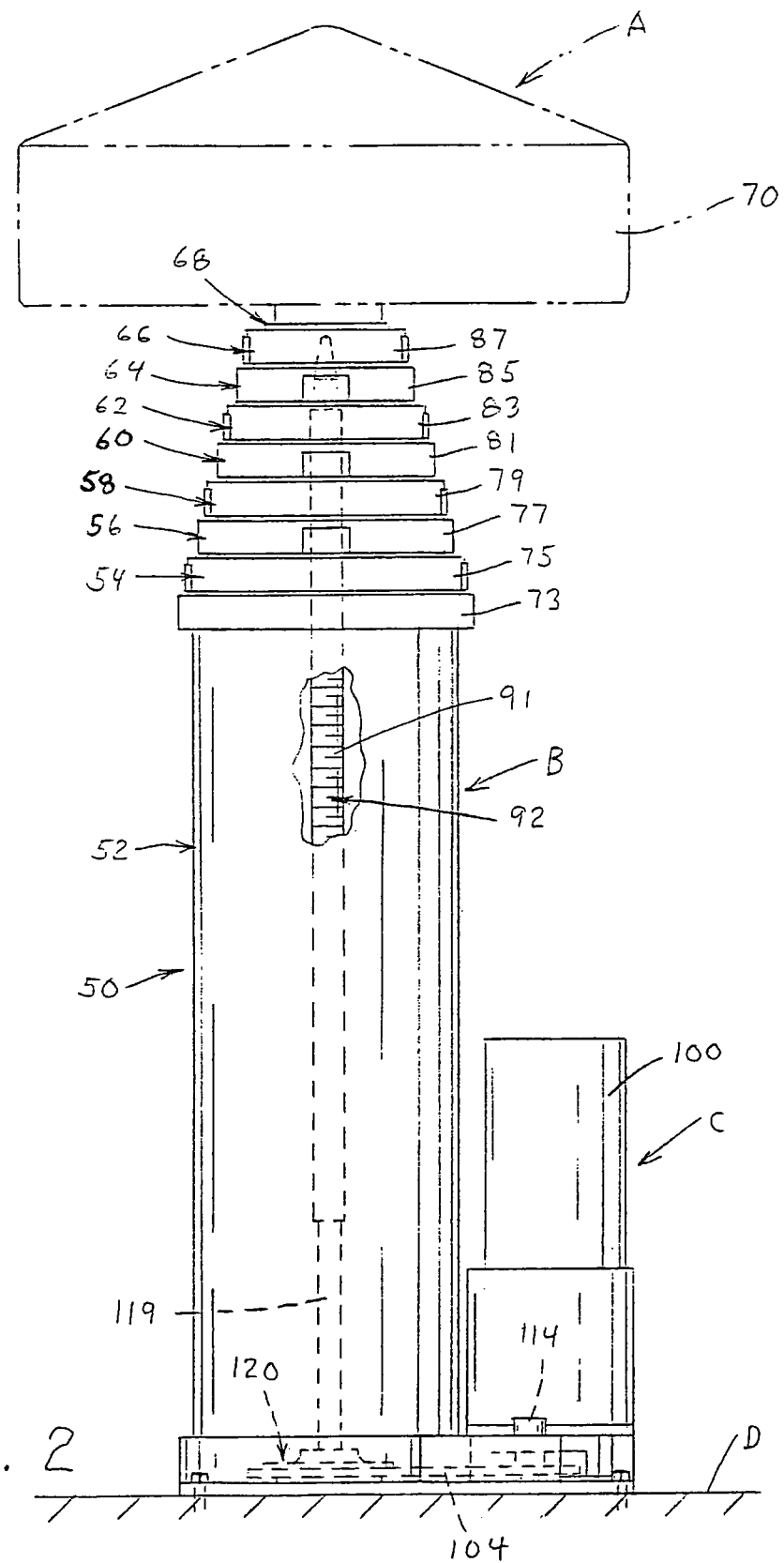
FIG. 2 is a side elevational view of a telescoping mast assembly in a fully retracted position in accordance with a preferred embodiment of the present invention.
Figure 3:
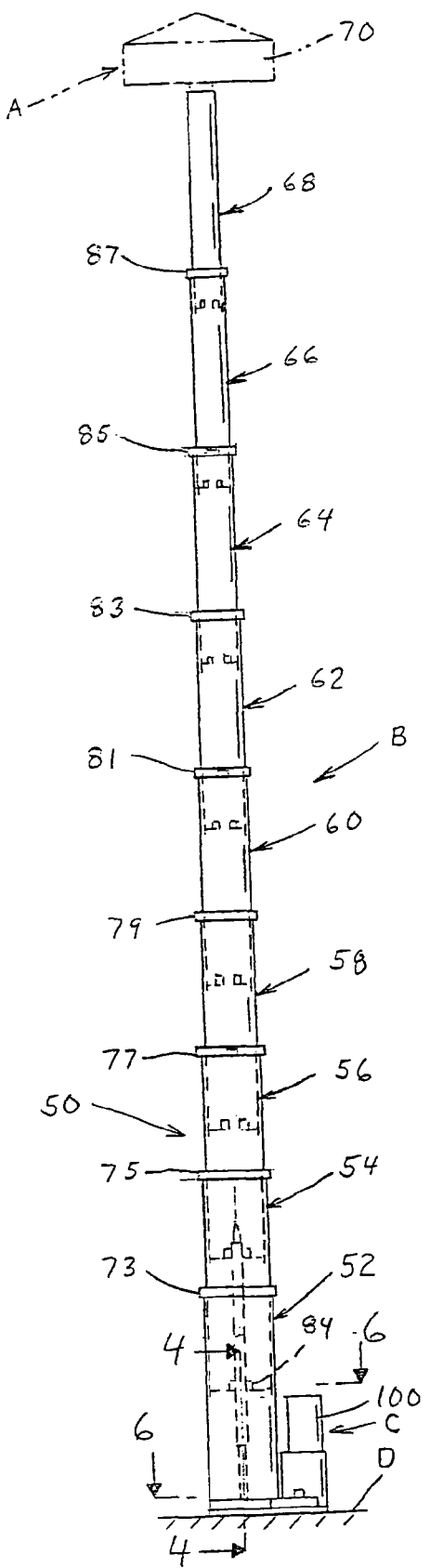
FIG. 3 is a side-elevational view of the telescoping mast of FIG. 1 in a fully extended position.

Referring now to FIG. 2, a mast assembly is shown which uses the rigid bearing support of FIG. 5. An antenna A is used with a mast assembly B and an associated gear drive unit C. A telescoping mast assembly 50 is typically used in conjunction with a vehicle or ground surface D. The telescoping mast assembly 50 typically includes a plurality of interconnected mast sections 52, 54, 56, 58, 60, 62, 64, 66 and 68 as shown in FIG. 2. Although nine interconnected mast sections are illustrated, it is within the scope of the present invention to incorporate any number as desired. Typically, the mast extends vertically in a range from about 20 feet to about 150 feet. However, it is within the terms of the invention to lengthen or shorten the range as required. As illustrated in FIGS. 2 and 3, the outermost mast section is stationary and is immovably affixed to a movable support structure such as a vehicle or ground surface D. The innermost mast section 68 is attached to any desired operating equipment 70, such as an antenna, which is supported by the mast assembly 50.

As further illustrated in FIG. 3, each of the interconnected mast sections are cylindrical tubes having outwardly extending cylindrical collars 73, 75, 77, 79, 81, 83, 85, 87 which have a slighter larger diameter than the external diameter of the tubes 52-66, respectively, in a longitudinal direction. The cylindrical collars can provide a bearing surface between the cylindrical tubes. The collars are substantially parallel to each other.

Typically, the individual mast sections are manufactured from high strength, heat treated anodized aluminum alloy tubes and collars. It is also within the terms of the present invention to form the tubes of other materials such as carbon fiber-epoxy composite structures which are advantageous because of their light weight relative to their high strength. Moreover, these materials can easily be shaped into cross-sections, other than circular, as desired.

The mast is shown fully extended in FIG. 3. As is well known in the art, tube sections latch or lock onto adjacent tube sections until the mast is fully extended. Tube section 52 remains stationary. During retraction of the mast, latch plates are uncoupled from latch bodies and the tubes are unlocked from each other and lowered. As can be seen from FIG. 3, there is some overlap between adjacent tubes when they are fully extended. That is, the latches and latch receiving members are typically positioned about half way along the longitudinal axis of each tube section so that a portion of each tube extends into a portion of an adjacent tube and has some overlap with the adjacent tube.

Figure 4:
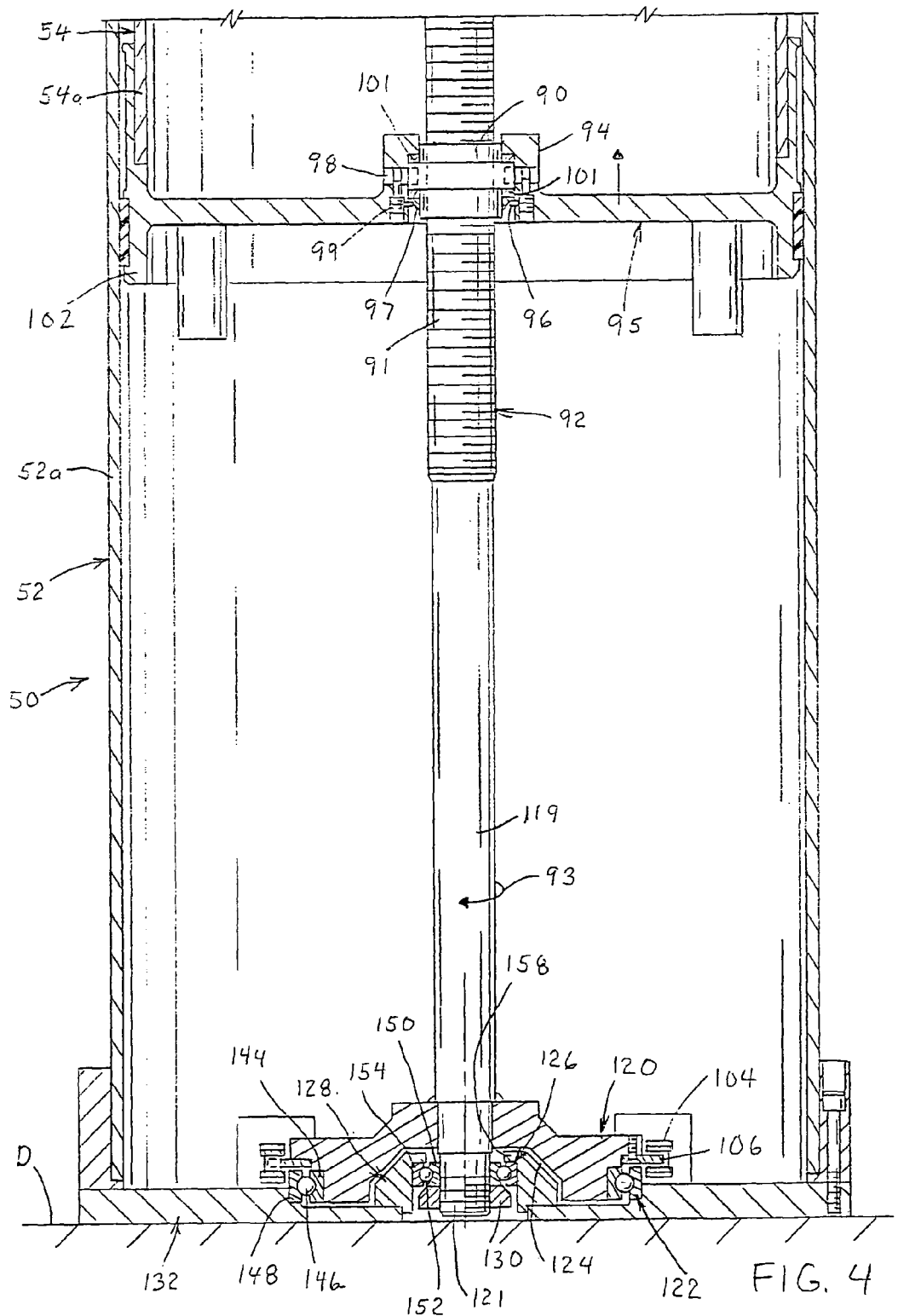
FIG. 4 is an enlarged sectional view taken along line 4-4 of FIG. 3 of the telescoping mast assembly illustrating a mast support bearing assembly with a rigid bearing support having concentric bearings in accordance with the preferred embodiment of the present invention.

Referring now to FIG. 4, inner tube section 54a of tube 54 is secured to outermost tube section 52a of tube 52 and partially extends into tube 52. A threaded nut 90 is in threaded engagement with threaded portion 91 of drive screw 92. From a top view of the mast, the screw is rotated clockwise (see arrow 93) to raise the nut and the corresponding tube section. The nut is housed within a central raised portion 94 of plate 95. The plate 95 is attached to one end of tube 54. The nut 90 is captured via a retaining ring 96 and a washer 97. Further, a grooved pin 98 which engages a portion of the nut also engages a set screw 99 to maintain its position. Springs 101 can be positioned above and below the pin to provide further biasing of the pin in an engaging position.

Figure 6:
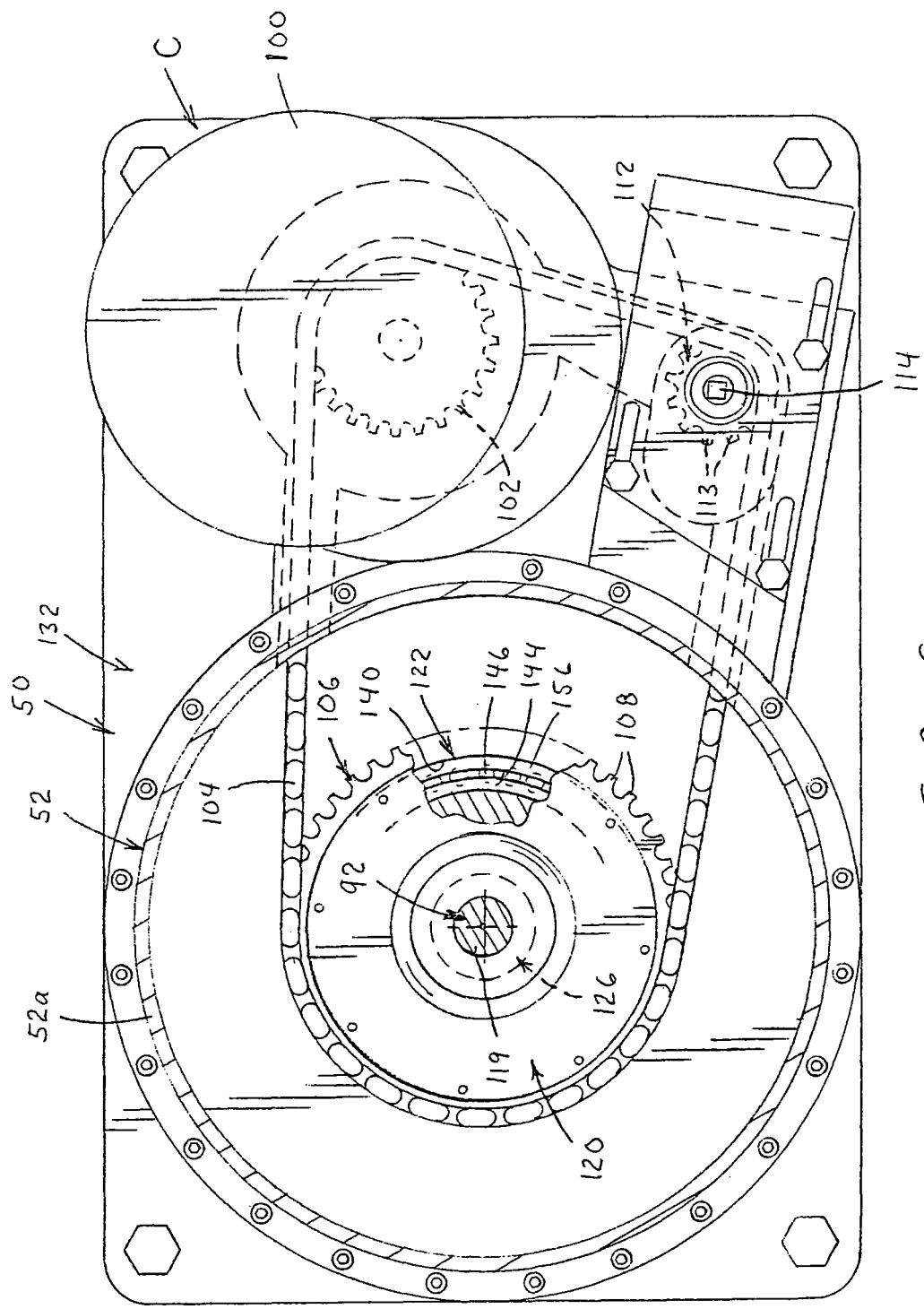

One example of a driving mechanism for the mast assembly is shown in FIG. 6. A sprocket and chain drive is illustrated, but a gear drive or belt assembly could also be used without departing from the scope of the invention. A motor 100 is provided adjacent to the mast assembly. The motor assembly includes a sprocket 102 which is connected via chain 104 to sprocket 106 mounted rigidly and concentrically to the drive screw 92. Sprocket 106 has a plurality of sprocket teeth 108 which engage the chain 104.

The drive system further includes a manual drive sprocket 112 for manually driving the mast sections if the motor assembly does not properly function. A manual crank arm (not shown) is vertically placed in a socket 114 of the manual drive. The crank arm is then rotated to raise or lower the mast.

This chain drive system includes a plurality of teeth 113 for manually driving the mast sections if the motor assembly does not properly function.

Other drive systems can be used, including, but not limited to, a belt drive in which a belt replaces the chain, a spur gear drive in which a driving spur gear engages a driven gear rigidly attached to drive screw, likewise a worm gear drive, and perhaps a bevel gear drive.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A telescoping mast assembly, comprising:
   at least two elongate tubular sections, wherein a second elongate tubular section is telescopically received by a first elongate tubular section;
   a rotating shaft centrally located in said mast assembly for extending and retracting said second elongate tubular section; and,
   a lower support assembly configured for supporting a lower portion of said rotating shaft, said lower support comprises a first inner bearing assembly and a second outer bearing assembly arranged horizontally and concentrically about said rotating shaft; wherein said first inner bearing assembly comprises a ball bearing housing comprising ball bearings which is positioned within a substantially concave opening of a ball bearing housing comprising ball bearings of said second outer bearing assembly and said first inner bearing assembly is positioned within said second outer bearing assembly; such that said second outer bearing assembly housing comprises a single portion that both surrounds and covers adjacent to at least upper and side ends of said first inner bearing assembly housing and wherein said second outer bearing assembly is concentric with said first inner bearing assembly and said second outer bearing assembly is positioned radially outwardly from said first bearing assembly in a horizontal direction wherein said ball bearings of said inner bearing assembly all lie in a first horizontal plane extending through of a centerline of said ball bearings of said inner bearing assembly located above a second horizontal plane extending through a centerline of said ball bearings of said outer bearing assembly, wherein said ball bearings of said outer bearing assembly all lie in said second horizontal plane and wherein said second outer bearing assembly housing and said first inner bearing assembly housing do not move in a longitudinal direction along a longitudinal axis of said rotating shaft.

2. The telescoping mast assembly of claim 1, wherein said second elongate tubular section comprises a bottom member extending between opposite ends of said second elongate tubular section, said bottom member comprises an opening for receiving said rotating shaft.

3. The telescoping mast assembly of claim 2, wherein said bottom member comprises a threaded nut mounted in said opening, wherein said threaded nut is threadably engaged by a threaded portion of said rotating shaft.

4. The telescoping mast assembly of claim 1, further comprising a drive assembly for rotating said rotating shaft.

5. The telescoping mast assembly of claim 1, wherein said rotating shaft comprises an elongate member with threads.

6. The telescoping mast assembly of claim 5, wherein said rotating shaft comprises an upper, threaded portion, an intermediate, unthreaded portion, and a lower, threaded portion.

7. The telescoping mast assembly of claim 1, wherein said lower support assembly comprises a hug nut positioned adjacent an inner ball bearing assembly of said first inner bearing assembly and surrounding a lower portion of said rotating shaft.

8. The telescoping mast assembly of claim 7, wherein said inner ball bearing assembly is retained at a lower end by said hug nut and at an upper end by said first inner bearing assembly.

9. The telescoping mast assembly of claim 1, further comprising an outer ball bearing assembly retained on an upper end by said second outer bearing assembly and at a lower end by a bearing assembly base.

10. The telescoping mast assembly of claim 9, wherein said rotating shaft is connected to said second bearing outer assembly through said outer ball bearing assembly.

11. The telescoping mast assembly of claim 1, wherein said rotating shaft comprises a drive screw.

12. The telescoping mast assembly of claim 11, wherein torque is supplied to said drive screw to operate the mast via a drive assembly.

* * * * *